United States Patent [19]

Maruo

[11] Patent Number: 5,151,007
[45] Date of Patent: Sep. 29, 1992

[54] INDUSTRIAL USE ROBOT WITH HORIZONTAL MULTIPLE ARTICULATED ARMS WITH MEANS TO MINIMIZE OR ELIMINATE INTERFERENCE AMONG DRIVING PORTIONS

[75] Inventor: Tomohiro Maruo, Katano, Japan

[73] Assignee: Matsushita Electric Industrial Co., Ltd., Osaka, Japan

[21] Appl. No.: 657,817

[22] Filed: Feb. 20, 1991

[30] Foreign Application Priority Data

Feb. 20, 1990 [JP] Japan .................................. 2-37304

[51] Int. Cl.⁵ .............................................. B25J 9/06
[52] U.S. Cl. ................................ 414/744.2; 414/719; 901/15; 901/48; 212/197
[58] Field of Search .................. 414/719, 744.2, 744.5, 414/917; 901/48, 15; 212/197

[56] References Cited

U.S. PATENT DOCUMENTS

| | | |
|---|---|---|
| 4,648,785 | 3/1987 | Nakagawa et al. ............. 414/917 X |
| 4,695,027 | 9/1987 | Lindholm et al. ................ 901/48 X |
| 4,759,674 | 7/1988 | Schroder et al. ................. 901/48 X |

FOREIGN PATENT DOCUMENTS 1465298  3/1989  U.S.S.R. .............................. 414/917

*Primary Examiner*—Robert J. Spar
*Assistant Examiner*—Donald W. Underwood
*Attorney, Agent, or Firm*—Wenderoth, Lind & Ponack

[57] ABSTRACT

Robots for industrial use having an arm mechanism of a horizontal multiple articulated type.

The load movement mechanism and the arm expansion mechanism, which are provided within the robot arms in advance with respect to the change condition through the catching of the gravity force changes by the force sensor from a case where the weight is moved, placed to a case where nothing is grasped, are properly operated, so that the mutual dynamic interferences of the respective driving portions of the robot may not be caused or may be made minimum, and may be made simple in shape by the comparatively simple control apparatus, with an effect that the superior robot which is capable of stable operations may be realized.

9 Claims, 7 Drawing Sheets

INDUSTRIAL USE ROBOT WITH HORIZONTAL MULTIPLE ARTICULATED ARMS WITH MEANS TO MINIMIZE OR ELIMINATE INTERFERENCE AMONG DRIVING PORTIONS

BACKGROUND OF THE INVENTION

The present invention generally relates to robots for industrial use having an arm mechanism of a horizontal multiple articulated type.

Generally, robots called a horizontal multiple articulated type are used as robots for industrial use so as to automate an assembling operation and other operations.

FIGS. 7 and 8 show the construction principles of conventional robots of this type. FIG. 7 is a serial arm type robot as a first conventional robot. FIG. 8 is a parallelogram link arm type robot as a second conventional robot.

In FIG. 7($a$), the serial arm type robot of the first conventional type includes a first prime mover 38, a second prime mover 39, arms 40, a grasping mechanism 41 to grasp an object 42 to be grasped, and a robot control unit 43. One end of a first arm 40$a$ is mounted on the driving shaft of the first prime mover 38. The second prime mover 39 is disposed on the other end of the first arm 40$a$, and a second arm 40$b$ is mounted on the driving shaft of the second prime mover 39. The grasping mechanism 41 is provided on the other end of the second arm 40$b$ so as to grasp the object 42 ith the grasping mechanism 41. The first prime mover 38, the second prime mover 39 and the grasping mechanism are adapted to be controlled during action by the robot control apparatus 43.

The operation of the robot constructed as described hereinabove will be described hereinafter. The action instructions are given to the first prime mover 38, the second prime mover 39 and the grasping mechanism 41 from the robot control apparatus 43 in accordance with the operation data stored in advance within the memory (not shown) of the robot control apparatus 43 to cause the arms 40 to effect the desired actions so as to effect pick and place operations with respect to the object 42 to be grasped.

FIG. 7($b$) shows the torques T1, T2 to be caused in the first prime mover 38 and the second prime mover 39 when the pick and place operations are effected. In FIG. 7($b$), the revolution center of the first prime mover 38 conforms to the origin on the absolute coordinates axis (x-y), the angle formed by the first arm 40$a$ and the y positive axis is $\Theta 1$, the angle to be formed by the second arm 40$b$ and the first arm 40$a$ is $\Theta 2$, the length of the first arm 40$a$, the mass, the inertial moment round the gravity center position, the force such as the frictional force to be caused in the bearing portion are respectively l1, m1, I1, F1, the length of the second arm 40$b$, the mass, the inertial moment round the gravity position, the force such as frictional force to be caused in the bearing portion are respectively l2, m2, I2, F2, the inertial moments of the first prime mover 38 and the second prime mover 39 are respectively Is1, Is2, the distance from the revolution center of the first prime mover 38 to the gravity center position (shown by the X mark in the drawing) of the second arm 40$b$ is h2, the mass of the motor provided on the revolution central portion of the second prime mover 39 is considered a material point (shown by the ● mark in the drawing) w1, the mass of the grasping mechanism 41 provided on the tip end portion of the second arm 40$b$ is considered a material point (shown in the ● mark in the drawing) w2. The production torque T1 of the first prime mover and the production torque T2 of the second prime mover are given by the following dynamic formula of Lagrange.

$$\begin{pmatrix} T1 \\ T2 \end{pmatrix} = \begin{pmatrix} J11 & J12 \\ J21 & J22 \end{pmatrix} \begin{pmatrix} \ddot{\theta}1 \\ \ddot{\theta}2 \end{pmatrix} + \begin{pmatrix} E11 & E12 \\ E21 & E22 \end{pmatrix} \begin{pmatrix} \dot{\theta}1^2 \\ \dot{\theta}2^2 \end{pmatrix} + \begin{pmatrix} K1 \\ K2 \end{pmatrix} \dot{\theta}1\dot{\theta}2 + \begin{pmatrix} F1 \\ F2 \end{pmatrix} \quad (1)$$

where $J11 = (m1h1^2 + m2l1^2 + m2h2^2 + w1l1^2 + w2l1^2 + w2l2^2 + I1 + I2 + Is1 + Is2) + 2(m2l1h2 + w2l1l2)\cos\theta 2$ $J12 = J21 = (m2h2^2 + w2l2^2 + I1 + Is2) + (m2l1h2 + w2l1l2)\cos\theta 2$ $J22 = m2h2^2 + w2l2^2 + I2 + Is2$ $E11 = E22 = 0$ $E12 = -E21 = -(m2l1h2 + w2l1l2)\sin\theta 2$ $K1 = -2(m2l1h2 + w2l1l2)\sin\theta 2$ $K2 = 0$ As the coefficient (m2l1h2+w2l1l2) of the angle $\Theta 2$ formed by the first arm 40$a$ and the second arm 40$b$ cannot be made "0" in the respective formula, the size of the coefficient of the J11 is changed by a change in the $\Theta 2$. This shows the dynamic interference between the first prime mover 38 and the second prime mover 39 by the operation of the arm 40. A compensation control for avoiding the dynamic interference is necessary to be effected with respect to the first prime mover every time the second arm 40$b$ operates, so that the control portion becomes composite and expensive.

The second conventional robot shown in FIG. 8 is provided in an effort to overcome the above described problem. In FIG. 8($a$), the parallelogram link arm type robot provided as the second conventional robot includes a first prime mover 44, a second prime mover 45, arms 46, a grasping mechanism 47 to grasp an object 48 to be grasped, and a robot control apparatus 49. One end of the first arm 46$a$ is mounted on the driving shaft of the first prime mover 44. Also, a second prime mover 45 is provided on the same shaft as the rotary shaft of the first prime mover 44, with one end of the second arm 46$b$ being mounted on the driving shaft of the second prime mover 45. One end of a third arm 46$c$ which is equal in length to the first arm 46$a$ is coupled to the other end of the second arm 46$b$. A fourth arm 46$d$ is coupled to the other end of the third arm 46$c$ and to the other end of the first arm 46$a$ so that the arm 46 constitutes the parallelogram link construction with four arms. A grasping mechanism 47 is provided on the other end of the fourth arm 46$d$ so as to grasp the object 48 by the grasping mechanism .47. The first prime mover 44, the second prime mover 45 and the grasping mechanism 47 are adapted to be controlled in operation by the robot control unit 49.

The operation of the robot constructed as described hereinabove is the same as in the first embodiment, and the description thereof will be described.

FIG. 8(b) shows the torques T1, T2 to be caused in the first prime mover 44 and the second prime mover 45 when the robot effects a pick and place operation. In FIG. 8(b), the revolution center of the first and second prime movers conforms to the origin on the absolute coordinates axis (x-y), an angle to be formed with a first arm 46a and the y positive axis is Θ1, an angle to be formed by a second arm 46b and the x negative axis is Θ2, the length of the first arm 46a, the mass, the inertial moment round the gravity center, the force such as frictional force and to be caused on the bearing portion are respectively l1, m1, I1, F1, the length of the second arm 46b, the mass, the inertial moment round the gravity center, the force such as frictional force to be caused in the bearing portion are respectively l2, m2, I2, F2, the length of the third arm 46c, the mass, the inertial moment round the gravity center are respectively m3, I3 (the length is l1 as in the first arm 44), the length of the fourth arm 46d, the mass, the inertial moment round the gravity center are respectively (l2+l4), m4, I4, the inertial moments of the first and second prime movers are respectively Is1, Is2, the distance from the revolution center of the first prime mover 44 to the gravity center position (shown by the X mark in the drawing) of the first arm 46a from the revolution center of the first prime mover 44 and the distance to the gravity center position (shown by the X mark in the drawing) are respectively h1, h2, the distance from the tip end position of the second arm 46b to the gravity center position (shown by the X mark in the drawing) of the third arm 46c from the tip end position of the second arm 46b is h3, the distance from the tip end position of the first arm 46a to the gravity center position (shown by the X mark in the drawing) of the fourth arm 46d is h4, the mass of the grasping mechanism 47 which are provided in the tip end portion of the fourth arm 46d is considered the material point (shown by the • mark in the drawing) w1. The production torques T1 and T2 are given by the following dynamic formula of Lagrange.

$$\begin{pmatrix} T1 \\ T2 \end{pmatrix} = \begin{pmatrix} J11 & J12 \\ J21 & J22 \end{pmatrix} \begin{pmatrix} \ddot{\theta}1 \\ \ddot{\theta}2 \end{pmatrix} + \begin{pmatrix} E11 & E12 \\ E21 & E22 \end{pmatrix} \begin{pmatrix} \dot{\theta}1^2 \\ \dot{\theta}2^2 \end{pmatrix} + \begin{pmatrix} F1 \\ F2 \end{pmatrix} \quad (2)$$

where
$J11 = m1h1^2 + m3h3^2 + m4l1^2 + w1l1^2 + I1 + I3 + Is1$
$J12 = J21 = (w4l1^{h4} - m3l2h3 + w1l1h4) \times \sin(\theta1 - \theta2)$
$J22 = m2h2^2 + m3l2^2 + m4h4^2 + w1l4^2 + I2 + I4 + Is2$
$E11 = E22 = 0$
$E12 = -E21 = -(m4l1h4 - w3l2h3 + w1l1h4)\cos(\theta1 - \theta2)$ As Θ1 and Θ2 are included in respective formulas of J12, J21, E12 and E21, and the coefficients of Θ1 and Θ2 become (m4l1h4−w3l2h3+w1l1h4) in the (2) formula, dynamic interference is caused between the first and second prime movers during the operation of the arm 46 as in the first conventional embodiment if the coefficient is not "0". But a negative term is included in the coefficient (m4l1h4−m3l2h3+w1l1h4), so that it may be made "0" by devising a proper design of the arm. The terms J12, J21, E11, E12, E21 and E22 all become "0" in the (2) formula, and J11 and J22 which do not include Θ1 and Θ2 have only constant values, with a large advantage that the robot may be operated comparatively stably with simple and inexpensive control apparatus without any dynamic interference between the first and second prime movers accompanied by the operation of the arm 46.

The parallelogram link arm type robot in the second conventional embodiment poses no problem when the robot arms alone are independently operated and the pick and place operation is effected with respect to an extremely light object. When an object as heavy as the mass of one arm or heavier than such mass is grasped, moved and placed, the arm tip end mass is changed greatly between the condition in which the weight is grasped and the condition in which the weight is not grasped. As the term w1 of the coefficient (m4l1h4−m3l2h3+w1l1h4) given in the description in the second conventional embodiment undergoes large changes, the above described coefficient which has been made "0" purposely in the condition where the object is not grasped is adapted to have a value other than "0" when the object has been grasped, thus causing the dynamic interference between the first prime mover of the robot and the second prime mover accompanied by the operation of the arm, which causes a serious problem in the stable operation of the robot.

SUMMARY OF THE INVENTION

Accordingly, the present invention has been developed with a view to substantially eliminating the above discussed drawbacks inherent in the prior art, and has for its essential object to provide an improved robot.

Another important object of the present invention is to provide an improved robot, where the mutual dynamic interferences among the respective driving portions of the robot are not caused or the dynamic interferences are made minimum and simpler in shape by a comparatively simple control apparatus for a case where the robot carries and places the object and a case where the robot does not grasp anything, so as to effect a stable operation.

In order to achieve the above described objects, according to a first embodiment of the present invention, there is provided a robot which includes first and second prime movers that are provided with coaxial shafts with the revolution operation being effected in the horizontal direction, horizontal multiple articulated type arms which constitute a parallelogram link construction with a first arm mounted at its one end on the first prime mover, a second arm mounted at its one end on the second prime mover, a third arm coupled at its one end to the second arm, a fourth arm coupled at its one end to the third arm and coupled at its other end or an intermediate portion to the first arm, a movable load provided on the third arm, a movable load provided on the fourth arm, a movement mechanism for respectively moving the loads individually along the third and fourth arms, a grasping mechanism for grasping the object provided on the fourth arm, a force sensor provided within the grasping mechanism, a control apparatus for controlling the movement of the loads in accordance with the signal from the force sensor, a control apparatus for controlling the operation of the arm, and which is characterized in that the dynamic interference components caused between the first and second prime movers are adapted to be offset by the movement of the loads in accordance with the weight change in the object to be grasped.

Also, in order to achieve the above described object, according to a second embodiment of the present invention, there is provided a robot which includes first and second prime movers that are provided with coaxial shafts with the revolution operation being effected in the horizontal direction, horizontal multiple articulated type arms which constitute a parallelogram link construction with a first arm being mounted at its one end on the first prime mover, a second arm mounted at its one end on the second prime mover, an extendable third arm coupled at its one end to the second arm, an extendable fourth arm coupled at its one end to the third arm, and coupled at its other end or its intermediate portion to the first arm, an extension mechanism for respectively extending and retracting the third and fourth arms individually, a grasping mechanism provided on the fourth arm so as to grasp an object, a force sensor provided within the grasping mechanism, a control apparatus for controlling the operation of the above extension mechanism in accordance with the signal from the force sensor, a control apparatus for controlling the operation of the arm, and which is characterized in that the dynamic interference components caused between the first and second prime movers are adapted to be offset by the extension and retraction of the third and forth arms in accordance with the weight change in the object to be grasped.

Also, in order to achieve the above described object, according to a third embodiment of the present invention, there is provided a robot which includes first and second prime movers that are provided with coaxial shafts with the revolution operation being effected in the horizontal direction, horizontal multiple articulated type arms which are composed of a first arm mounted at its end on the first prime mover, and an extendable second arm coupled at its one end to the first arm, and adapted to operate through the transmission of the revolution of the second prime mover by belting, a load provided on the second arm, a movement mechanism for moving the load along the second arm, an extension mechanism for extending and retracting the above described second arm, a grasping mechanism provided on the second arm so as to grasp the object, a force sensor provided within the grasping mechanism, a control apparatus for controlling the operations of the movement mechanism and the force sensor, a control apparatus for controlling the operations of the first and second arms, and which is characterized in that the dynamic interference components caused between the first and second prime movers are adapted to be offset by the movement of the load and the extension and retraction of the second arm in accordance with the weight change in the object to be grasped.

Also, in order to achieve the above described object according to a fourth embodiment of the present invention, there is provided a robot which includes a first prime mover to be rotated in the horizontal direction, a first arm mounted on one end of the first prime mover, a second prime mover mounted on the other end of the first arm and adapted to be rotated in the horizontal direction, an extendable second arm mounted on one end of the second prime mover, a load provided on the second arm, a movement mechanism for moving the load along the second arm, an extension mechanism for extending and retracting the above described second arm, a grasping mechanism provided on the second arm so as to grasp the object, a force sensor provided within the grasping mechanism, a control apparatus for controlling the operations of the movement mechanism and the extension mechanism in accordance with the signal from the force sensor, a control apparatus for controlling the operations of the first and second arms, and which is characterized in that the dynamic interference components caused between the first and second prime movers are adapted to be offset by the movement of the load and the extension and retraction of the second arm in accordance with the weight change in the object to be grasped.

According to the present invention, by the above described construction, a robot may be provided which can effect a stable operation without the mutual dynamic interferences among the respective driving portions of the robot by a comparatively simple control apparatus for a case where the robot is adapted to move and place a weight and a case where the robot grasps nothing.

BRIEF DESCRIPTION OF THE DRAWINGS

These and other objects and features of the present invention will become apparent from the following description of the preferred embodiments thereof with reference to the accompanying drawings, in which.

DETAILED DESCRIPTION OF THE INVENTION

Figure 1:
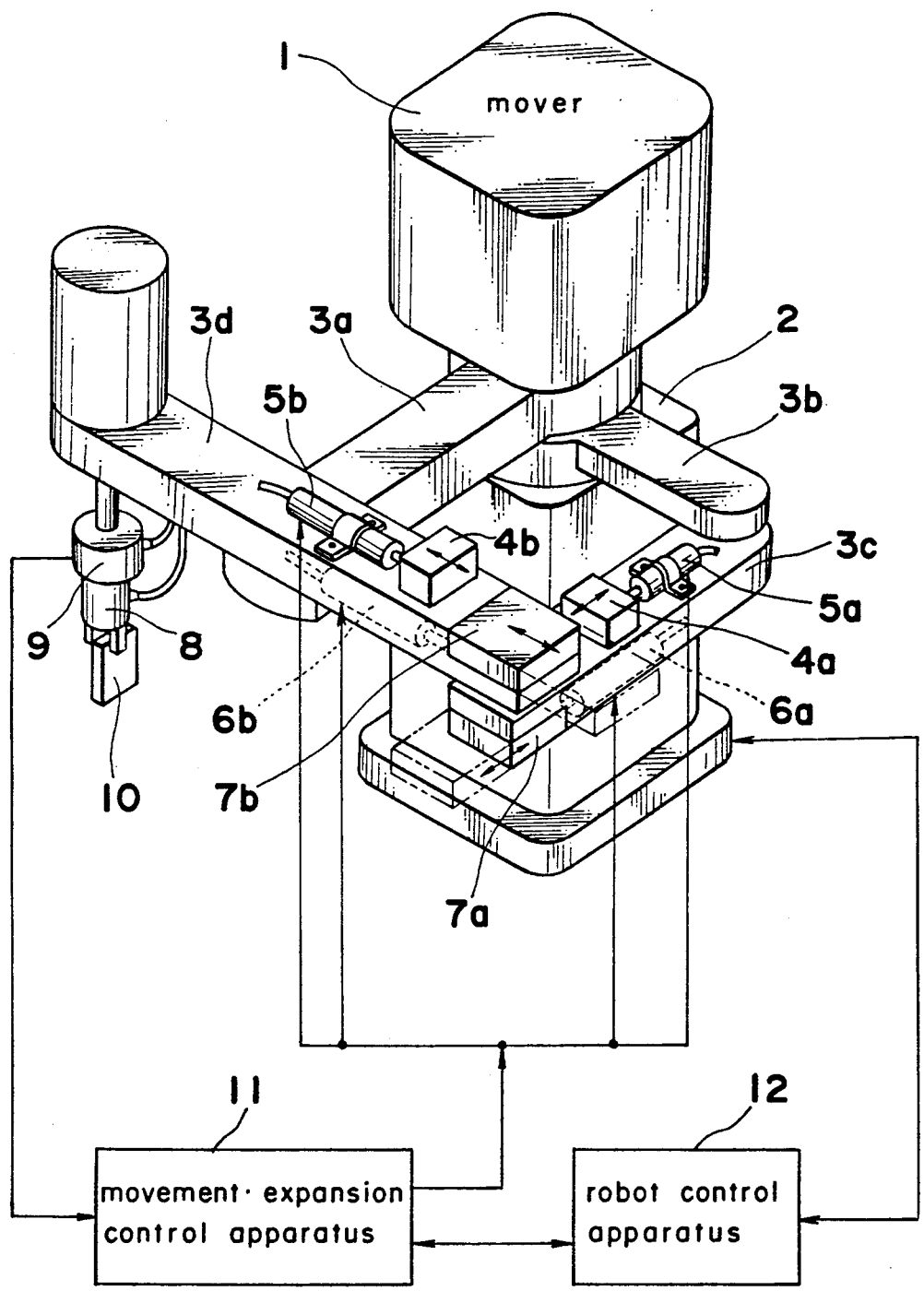
FIG. 1 is a combined perspective view and block diagram of a robot according to a first embodiment of the present invention.

Before the description of the present invention proceeds, it is to be noted that like parts are designated by like reference numerals throughout the accompanying drawings.

Referring now to the drawings, there is shown in FIG. 1 a robot according to the first embodiment of the present invention which includes a first prime mover 1, a second prime mover 2, an arm 3, a load 4, a movement mechanism 5, an extension mechanism 6, an extension portion 7, a grasping mechanism 8, a force sensor 9, an object 10 to be grasped, a movement-extension control apparatus 11, and a robot control apparatus 12. One end of the first arm 3a is mounted on the driving shaft of the first prime mover 1. Also, the second prime mover 2 is mounted on a shaft coaxial to the rotary shaft of the first prime mover 1. One end of this second arm 3b is mounted on the driving shaft of the second prime mover 2. One end of the third arm 3c which is equal in length to the first arm 3a is coupled to the other end of the second arm 3b. Also, the fourth arm 3d is coupled to the other end of the third arm 3c and the other end of the first arm 3a. The four arms 3a-3d constitute a parallelogram link construction. The load 4a is provided on the third arm 3c. The load 4a is connected with the movement portion of the movement mechanism 5a disposed on the third arm 3c, and composed of an air cylinder or motor and ball screw or the like, so that the load 4a is adapted to move along the third arm 3c by the movement mechanism 5a. One portion 7a of the one end of the third arm 3c is separate from and adapted to move in an extension movement along the remainder of the third arm 3c as an extension portion 7a by an extension mechanism 6a composed of an air cylinder disposed within the third arm 3c or a motor and ball screw or the like. The third arm 3c is thus adapted to extend and retract so as to vary the position of the center of gravity of the third arm 3c. The load 4b is provided on the fourth arm 3d, is connected with the movement portion of the movement mechanism 5b composed of an air cylinder or a motor and ball screw of the like. The load 4b is adapted to move along the fourth arm 3d by the movement mechanism 5b. Also, one portion 7b of one end of the fourth arm 3d is separate from and is adapted to move along the remainder of the fourth arm 3d as an extension portion 7b by the extension mechanism 6b composed of an air cylinder or a motor and ball screw or the like disposed within the fourth arm 3d. The fourth arm 3d is extended and retracted by the movement of the extension portion 7b so as to change the position of the center of gravity of the fourth arm 3d. A grasping mechanism 8 is provided on the other end of the fourth arm 3d, and the object 10 is grasped by the grasping mechanism 8. The force sensor 9 is built in the grasping mechanism 8. The signal from the force sensor 9 is adapted to be inputted into the movement-extension control apparatus 11. The movement-extension control apparatus detects the mass of the grasped object 10 and gives the proper operation instructions to the movement mechanism 5 and the extension mechanism 6, and also transmits the contents of the operation instructions to the robot control apparatus 12. The robot control apparatus 12 receives the signal from the movement-extension control apparatus 11 to change the operation parameter of the center of gravity position and so on so as to be in conformity with the present condition of the robot, and thereafter, to control the operation of the first prime mover 1, the second prime mover 2 and the grasping mechanism 8.

The operation of the robot constructed as described hereinabove will be described hereinafter.

In the above-described embodiment, in accordance with the operation data stored in advance within the memory (not shown) of the robot control apparatus 12, the operation instructions are given to the first prime mover 1, the second prime mover 2 and the grasping mechanism 8 to move the arm 3a to move the arm 3b to effect the desired operations so as to effect the picking up and placing operation with respect to the object 10. At this time, the movement-extension control apparatus 11 normally watches the signal output from the force sensor 9. The moment, for example, the grasping mechanism 8 grasps the object 10, the movement-extension control apparatus 11 reads the amount of weight change and gives the operation instructions to the movement mechanism 5 and the extension mechanism 6 in accordance with a predetermined simple calculation rule to be described later and to cause them to effect the proper operations, so that the already described calculation results are transmitted to the robot control apparatus 12. The robot control apparatus 12 also effects the operation control for the arm 3 or the like as described, and also normally watches the signal input from the movement-extension control apparatus 11. Immediately after the signal input has been received, the predetermined parameters in the necessary operation torque production formula with respect to the first prime mover 1 and the second prime mover 2 to be described later are adjusted in accordance with the contents of the input signal so as to continue the operation control of the above described robot in accordance with the formula.

Figure 2:
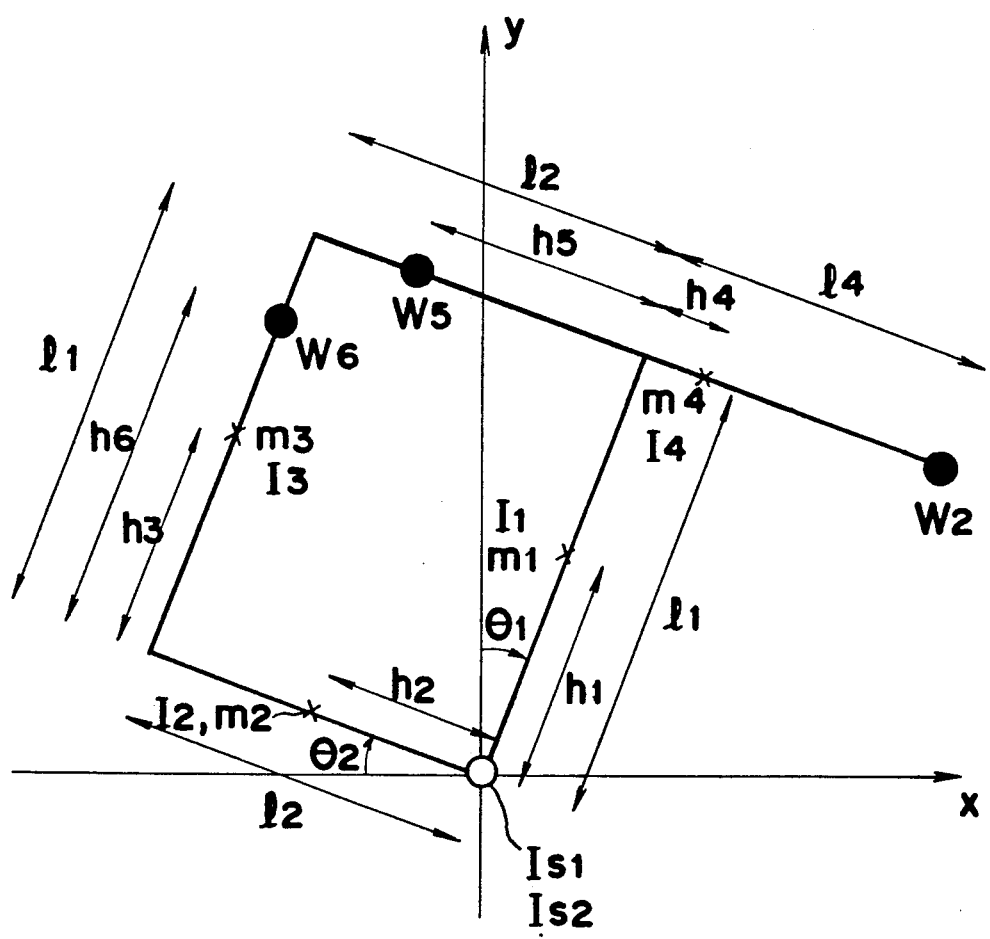
FIG. 2 is a diagram illustrating the operation principle of the robot shown in FIG. 1.

FIG. 2 shows the torques T1, T2 caused in the first and second prime movers 1 and 2 when the above described picking up and placing operation is effected. In FIG. 2, the center of rotation of the first and second prime movers 1 and 2 conforms to the origin on the absolute coordinates axis (x-y), an angle to be formed with the first arm 3a and the y positive axis is $\Theta1$, an angle to be formed by the second arm 3b and the x negative axis is $\Theta2$, the length of the first arm 3a, the mass, the inertial moment around the center of gravity, the force such as frictional force or the like in the bearing portion are respectively l1, m1, I1, F1, the length of the second arm 3b, the mass, the inertial moment around the center of gravity, the force such as frictional force or the like in the bearing portion are respectively l2, m2, I2, F2, the mass of the third arm 3c (length is l1), the inertial moment around the center of gravity are respectively m3, I3, the length of the fourth arm 3d, the mass, the inertial moment around the center of gravity are respectively (l2+l4), m4, Ir, the inertial moments of the first prime mover 1 and the second prime mover 2 are respectively Is1, Is2, the distance from the center of rotation of the prime mover 1 to the center of gravity (shown by the X mark in the drawing) of the second arm 3b are respectively h1, h2, the distance from the tip end of the second arm 3b to the center of gravity (shown by the X mark in the drawing) of the third arm 3c from the tip end of the second arm 3b is h3, the distance from the tip end of the first arm 3a to the center of gravity (shown by the X mark in the drawing) of the fourth arm 3d is h4, the mass of the grasping mechanism 8, the object 10 and so on which are at the tip end portion of the fourth arm 3d is considered to be at the material point (shown by the • mark in the drawing) as w2. The mass of the load 4a which is disposed on the third arm 3c, and is moved along the third arm 3c by the movement mechanism 5a is considered to be at the material point (shown by the • mark in the drawing) as w6, the distance from the tip end of the second arm 3b to the mass point position of the load 4a is h6, the mass of the load 4b point (shown by the • mark in the drawing) which is disposed on the fourth arm 3d, and is moved along the fourth arm 3d by the movement mechanism 5b is w5, the distance from the tip end of the first arm 3a to the material point position of the load 4b is h5. The torques T1 and T2 are given by the following dynamic equation of Lagrange.

$$\begin{pmatrix} T1 \\ T2 \end{pmatrix} = \begin{pmatrix} J11 & J12 \\ J21 & J22 \end{pmatrix} \begin{pmatrix} \ddot{\theta}1 \\ \ddot{\theta}2 \end{pmatrix} + \begin{pmatrix} E11 & E12 \\ E21 & E22 \end{pmatrix} \begin{pmatrix} \dot{\theta}1^2 \\ \dot{\theta}2^2 \end{pmatrix} + \begin{pmatrix} F1 \\ F2 \end{pmatrix} \quad (3)$$

where

-continued $$J11 = m1h1^2 + m3h3^2 + m4l1^2 + w2l1^2 + w5l1^2 + w6h6^2 + I1 + I3 + Is1$$

$$J12 = J21 = (w4l1h4 - m3l2h3 + w2l1l4 - w5l1h5 - w6l2h6)\sin(\theta1 - \theta2)$$

$$J22 = m2h2^2 + m3l2^2 + m4h4^2 + w2l4^2 + w5h5^2 + w6l2^2 + I2 + I4 + Is2$$

$$E11 = E22 = 0$$

$$E12 = -E21 = -(m4l1h4 - w3l2h3 + w2l1l4 - w5l1h5 - w6l2h6)\cos(\theta1 - \theta2)$$

As $\Theta1$ and $\Theta2$ are included in respective formulas J12, J21, E12, E21, the coefficients of $\Theta1$ and $\Theta2$ in the formula (3) becomes $$(m4l1h4 - m3l2h3 + w2l1l4 - w5l1h5 - w6l2h6) \quad (4)$$

and the values of T1 and T2 change every moment during the operation of the arm 3 if formula (4) is not "0" so as to cause dynamic interferences between the first and second prime movers 1 and 2. But three minus terms are included in formula (4), so that formula (4) can be made "0" by proper design of the arm. The terms J12, J21, E11, E22, E12, E21 all become "0" and J11, J22 which do not include the $\Theta1$ and $\Theta2$ have only constant values, so that dynamic interferences between the first and second prime movers 1 and 2 during operation of the arm 3 can be prevented. When the grasping mechanism 8 moves and places the object 10 which is comparatively larger in mass, the value of w2 in formula (4) changes greatly between a case where the object 10 is grasped and a case where no object is grasped. Suppose the design of the arm 3 is such that formula (4) has a value other than "0" when an object 10 is grasped, and dynamic interference is caused between the first and second prime movers 1 and 2. The movement-extension control apparatus 11 recognizes the variation in the amount of w2 sensed by the force sensor 9 so as to cause the value w2l1l4 to be changed in formula (4) by the amount of variation. Thereafter, one value or a plurality of values h5 or h6 which can be changed by the operation of the movement mechanisms 5a and 5b and h3, h4 are properly changed by the operation of the extension mechanisms 6a and 6b by an amount which is capable of offsetting the changed value of w2l1l4 by giving proper operation instructions to the movement mechanisms 5a and 5b and the extension mechanisms 6a and 6b for getting them to effect the operation. Also, at the same time, the values of h3, h4, h5, h6 after the variation are transmitted to the robot control apparatus 12. The robot control apparatus 12 is adapted to change h3, h4, h5, h6 and so on from the parameter values of formula (3) stored in advance within the memory (not shown) so as to change them into the received values for continuing the operations of the first and second prime movers 1 and 2.

According to the robot of the first embodiment of the present invention as described hereinabove, the movement mechanisms 5a and 5b and the extension mechanisms 6a and 6b are properly moved so that dynamic interference terms in the torque formula (3) for interference between the first and second prime movers 1 and 2 become "0" in response to the amount of weight changes of the object 10, so that dynamic interference caused between the first and second prime movers 1 and 2 is prevented in spite of the operation track of the arm 3 and the operation speed so as to achieve the stable robot operation.

Figure 3:
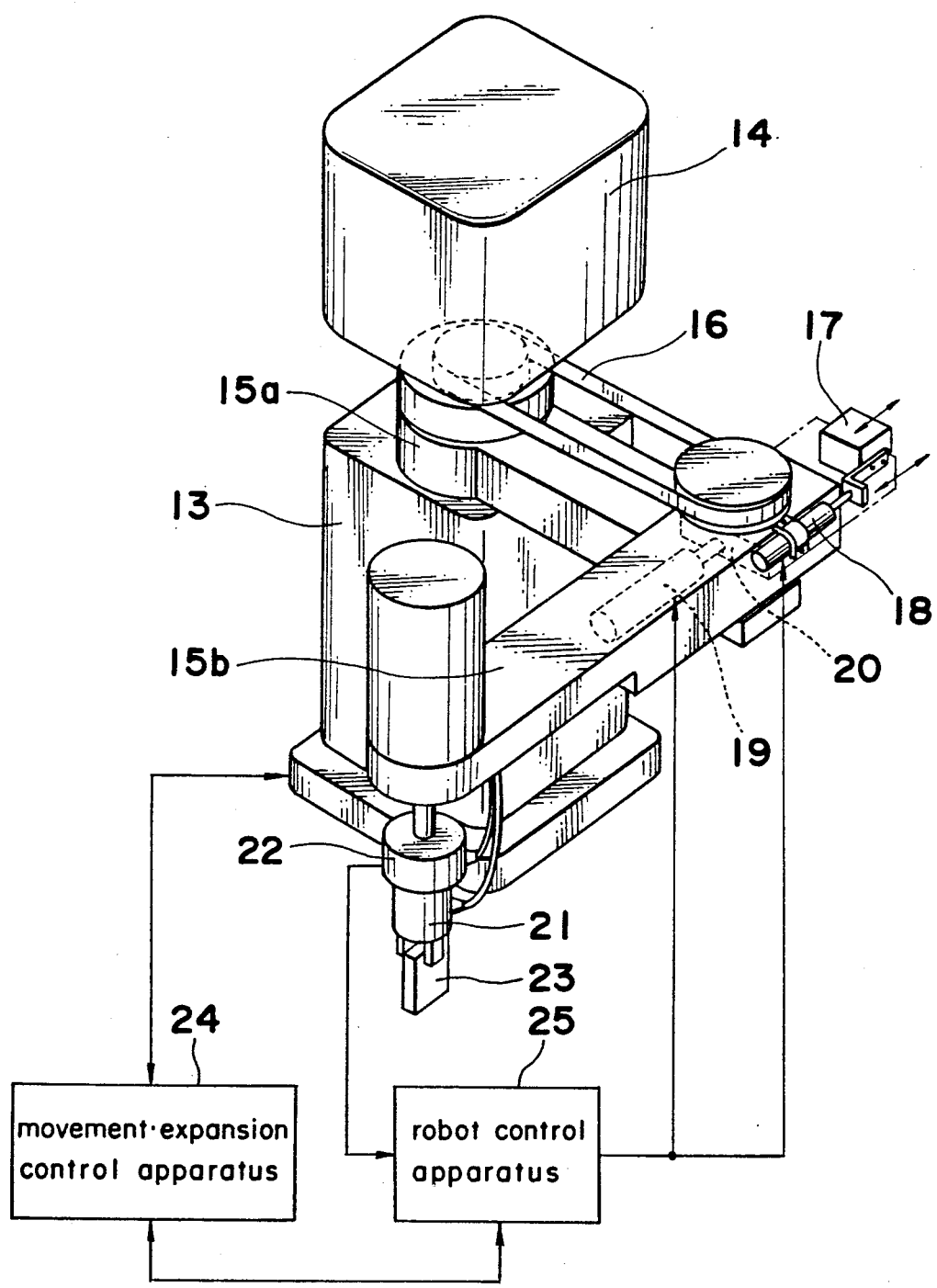
FIG. 3 is a combined perspective view and block diagram of a robot according to a second embodiment of the present invention.

FIG. 3 shows the construction of a robot according to a second embodiment of the present invention. The robot in FIG. 3 includes a first prime mover 13, a second prime mover 14, an arm 15, a belting 16, a load 17, a movement mechanism 18, an extension mechanism 19, an extension portion 20, a grasping mechanism 21, a force sensor 22, an object 23 to be grasped, a movement-extension control apparatus 24, and a robot control apparatus 25. One end of the first arm 15a is mounted on the driving shaft of the first prime mover 13. One end of the second arm 15b is coupled to the other end of the first arm 15a, and the driving shaft of the second prime mover 14, which is disposed coaxially with the center rotation of the driving shaft of the first prime mover 13, and the second arm 15b are coupled to each other by the belt 16, so that the revolution of the driving shaft of the second primer mover 14 is transmitted to the second arm 15b. The load 17 is movably mounted on the second arm 15b, and is connected to a movement mechanism 18 which can be an air cylinder as shown or a motor and ball screw or the like, so that the load 17 is adapted to move along the second arm 15b by operation of the movement mechanism 18. One portion 20 of one end of the second arm 15b is separate from and is adapted to move along the remainder of the second arm 15b as an extension portion by the extension mechanism 19 which can be an air cylinder as shown or a motor and ball screw or the like disposed within the second arm 15b. The second arm 15b is extended or retracted by the movement of the extension portion 20 to change the position of the center of gravity of the second arm 15b. A grasping mechanism 21 is provided on the other end of the second arm 15b, and the object 23 is grasped by the grasping mechanism 21. The force sensor 22 is built into the grasping mechanism 21. The signal from the force sensor 22 is adapted to be inputted into the movement-extension control apparatus 24 so as to detect the mass of the grasped object 23 and to give the proper operation instructions to the movement mechanism 18 and the extension mechanism 19, and also, to transmit the contents of the operation instructions to the robot control apparatus 25. The robot control apparatus 25 receives the signal from the movement-extension control apparatus 24 to change the operation parameters of the center of gravity position of the arm in conformity with the present condition of the robot and, thereafter, to control the operations of the first and second prime movers 13 and 14 and the grasping mechanism 21.

The operation of the robot constructed as described above will be described hereinafter.

In the above described embodiment, in accordance with the operation data stored in advance within the memory (not shown) of the robot control apparatus 25, the operaton instructions are given to the first and second prime movers 13 and 14 and the grasping mechanism 21 from the robot control apparatus 25 to move the arm 15 to effect the desired operations so as to effect the picking up and placing operation with respect to the object 23. At this time, the movement-extension control apparatus 24 normally watches the signal output from the force sensor 22. The moment, for example, the grasping mechanism 21 grasps the object 23, the movement-extension control apparatus 24 reads the amount of weight change and gives operation instructions to the movement mechanism 18 and the extension mechanism 19 in accordance with a predetermined simple calculation rule to be described later and to cause them to effect the proper operations, so that the already described calculation results are transmitted to the robot control apparatus 25. The robot control apparatus 25 also effects the operation control for arm 15 or the like as described hereinabove, and also normally watches the signal input from the movement-extension control apparatus 24. Immediately after the signal input has been received, the predetermined parameters in the necessary operation torque production formula with respect to the first and second prime movers 13 and 14 to be described later are adjusted in accordance with the contents of the input signal so as to continue the operation control of the above described robot in accordance with the formula.

Figure 4:
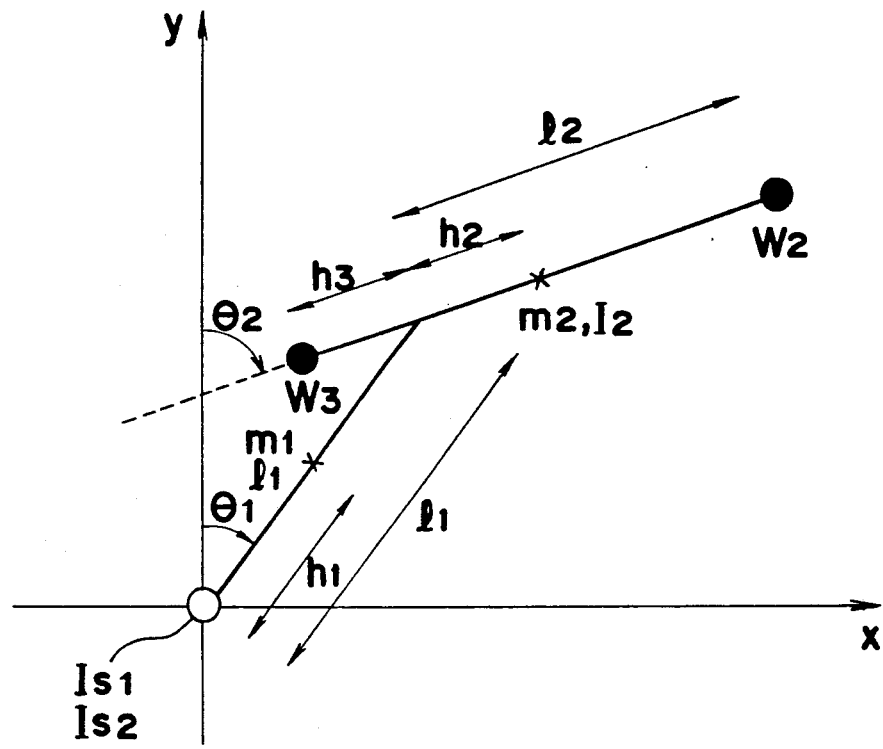
FIG. 4 is a diagram illustrating the operation principle of the robot shown in FIG. 3.

FIG. 4 shows the torques T1 and T2 caused in the first and second prime movers 13 and 14 when the above described picking up and placing operation is effected. In FIG. 4, the center of rotation of the first and second prime movers 13 and 14 conforms to the origin on the absolute coordinates axis (x-y), an angle to be formed with the first arm 15a and the y positive axis is Θ1, an angle to be formed by the second arm 15b and the y positive axis is Θ2, the length of the first arm 15a, the mass, the inertial moment around the center of gravity, the force such as frictional force or the like in the bearing portion are respectively l1, m1, I1, F1, the length of the second arm 15b, the mass, the inertial moment around the center of gravity, the force such as frictional force in the bearing portion are respectively l2, m2, I2, F2, the inertial moments of the first and second prime movers 13 and 14 are respectively Is1, Is2, the distance from the center of rotation of the first prime mover 13 to the center of gravity (shown by the X mark in the drawing) of the first arm 15a is h1, and the distance to the center of gravity (shown by the X mark in the drawing) of the second arm 15b from the tip end of the first arm 15a is h2, the mass of the grasping mechanism 21, the object 23 on which are provided at the tip end portion of the second arm 15b is considered to be at a material point (shown by the • mark in the drawing) as w2. The load 17 which is disposed on the second arm 15b, and is moved along the second arm 15b by the movement mechanism 18 is considered to be at the material point (shown by the mark • in the drawing) as w3, the distance from the tip end of the first arm 15a to the material point position of the load 17 is h3. The torques T1 and T2 are given by the following dynamic equation of Lagrange.

$$\begin{pmatrix} T1 \\ T2 \end{pmatrix} = \begin{pmatrix} J11 & J12 \\ J21 & J22 \end{pmatrix} \begin{pmatrix} \ddot{\theta}1 \\ \ddot{\theta}2 \end{pmatrix} + \begin{pmatrix} E11 & E12 \\ E21 & E22 \end{pmatrix} \begin{pmatrix} \dot{\theta}1^2 \\ \dot{\theta}2^2 \end{pmatrix} + \begin{pmatrix} F1 \\ F2 \end{pmatrix} \quad (5)$$

where $J11 = m1h1^2 + m2l1^2 + w2l1^2 + w3l1^2 + Is1 + I1$ $J12 = J21 = (m2l1h2 + w2l1l2 - w3l1h3)X\cos(\theta 1 - \theta 2)$ $J22 = m2h2^2 + w2l2^2 + w3h3^2 + Is2 + Is3 + I2$ $E11 = E22 = 0$ -continued $E12 = -E21 = -(m2l1h2 + w2l1h2 - w3l1h3)X\sin(\theta 1 - \theta 2)$ As Θ1 and Θ2 are included in respective formulas for J12, J21, E12, E21 in the above described formula, and the coefficients of Θ1 and Θ2 become $(m2lh2+w2ll2-w3lh3)$            (6)

values of T1 and T2 change every moment during the operation of the arm 15 if formula (6) is not "0" so as to cause dynamic interferences between the first and second prime movers 13 and 14. But minus terms are included in formula (6), so that formula (6) can be made "0" by proper design of the arm. The terms J12, J21, E11, E22, E12, E21 all become "0" and J11, J22 which do not include the Θ1 and Θ2 become constant values, so that dynamic interferences between the first and second prime movers 13 and 14 during the operation of the arm 15 can be prevented. When the grasping mechanism 21 moves, and places the object which is comparatively larger in mass, the value of w2 in formula (6) changes greatly between a case where the object 23 is grasped and a case where no object is grasped. If the design of the arm 15 is effected such that formula (6) becomes "0" when no object 23 is grasped, and formula (6) has a value other than "0" when an object 23 is grasped, and dynamic interference is caused between the first and second prime movers 13 and 14. The movement-extension control apparatus 24 recognizes the variation in the amount of w2 sensed by the force sensor 22 so as to cause the value w2l1l2 to be changed in formula (6) by the amount of rotation. Thereafter, one value or two values h3 which can be changed by the operation of the movement mechanism 18 or h2 which can be changed by the operation of the extension mechanism 19 are properly changed by an amount which is capable of offsetting the changed value of w2l1l2, by giving operation instructions to the movement mechanism 18 and the extension mechanism 19 to cause them to effect the operation. Also, at the same time, the values h2, h3 after the variations are transmitted to the robot control apparatus 25. The robot control apparatus 25 is adapted to change h2, h3 from the parameter values of formula (5) stored in advance within the memory (not shown), to match the received values for continuing the operations of the first and second prime movers 13 and 14 and so on.

According to the robot of the second embodiment of the present invention as described above, the movement mechanism 18 and the extension mechanism 19 are properly moved so that dynamic interference terms in the torque formula (5) for interference between the first and second prime movers 13 and 14 become "0" in response to the amount of variation of each of the weight changes of the object 23, so that dynamic interferences caused between the first and second prime movers 13 and 14 are prevented in spite of the operation track of the arm 15 and the operation speed so as to achieve a stable robot operation.

Figure 5:
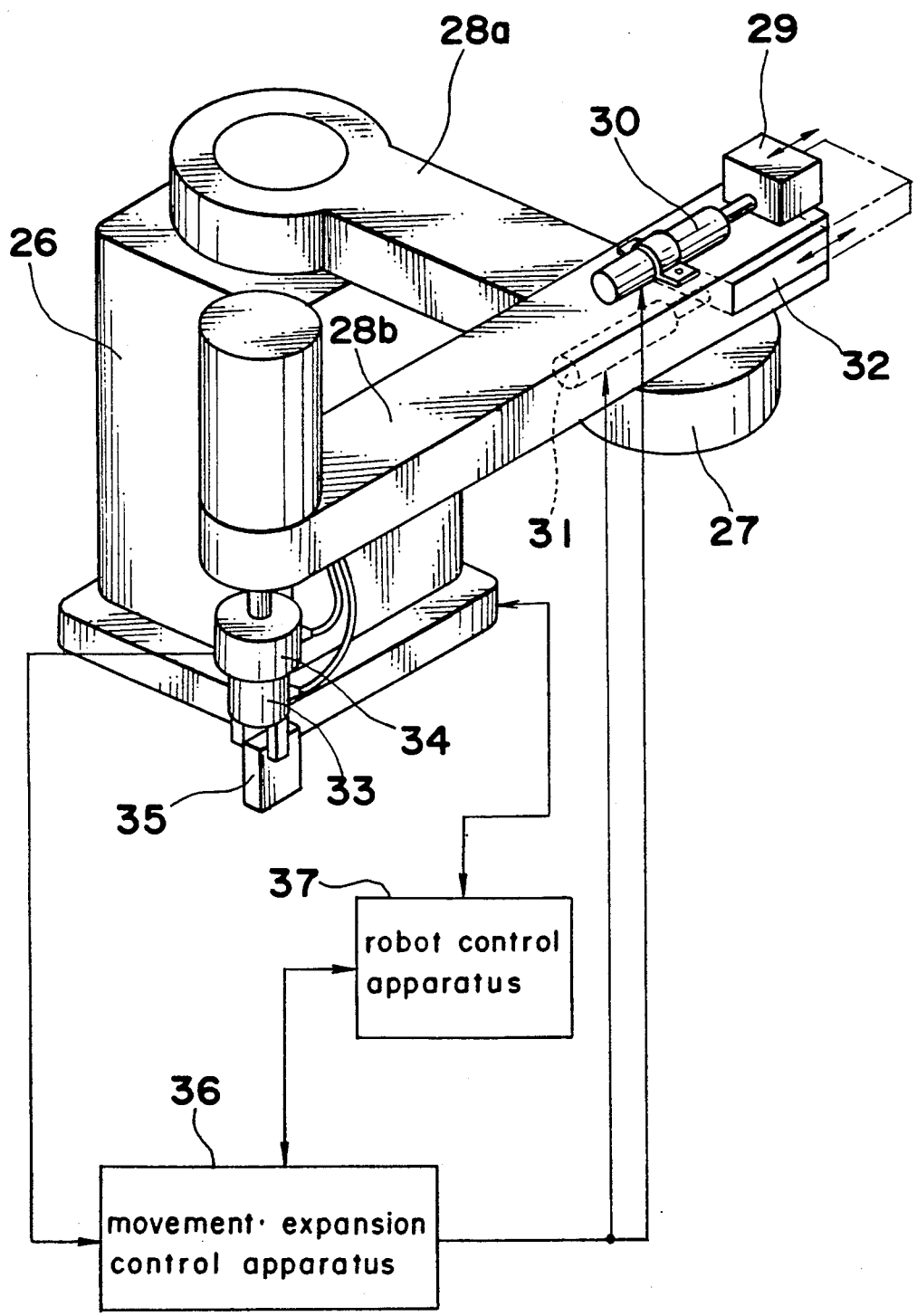
FIG. 5 is a combined perspective and block diagram of a robot according to a third embodiment of the present invention.
Figure 7A:
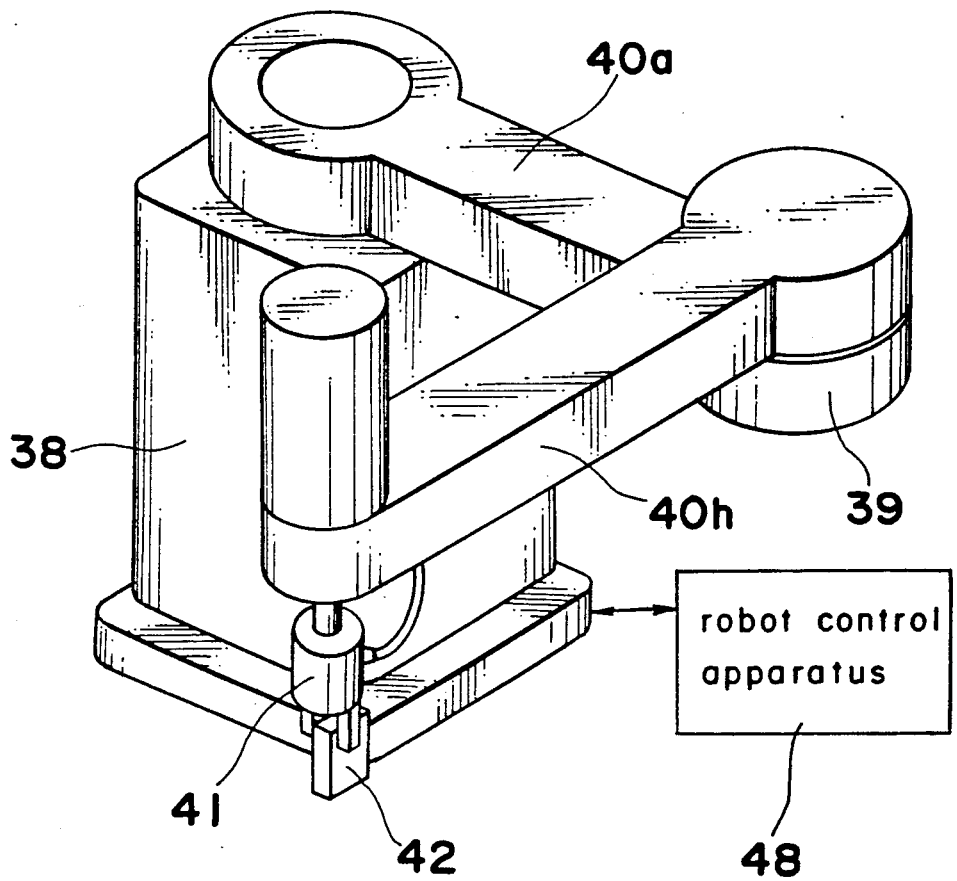
FIG. 7(a) is a combined perspective view and block diagram illustrating the construction of a first conventional robot and FIG. 7(b) is a diagram for showing the operation principle thereof.
Figure 7B:
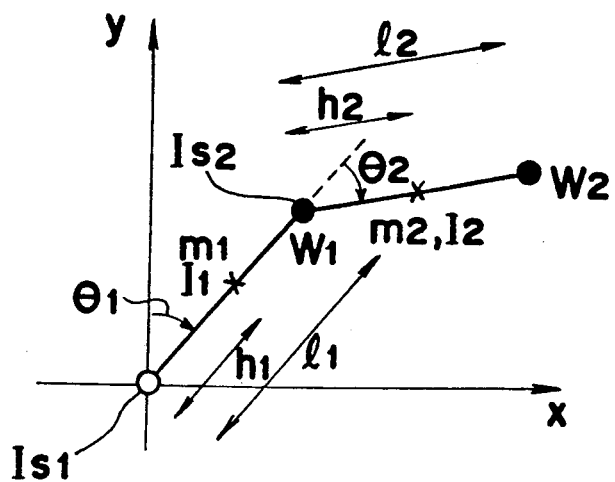
Figure 8A:
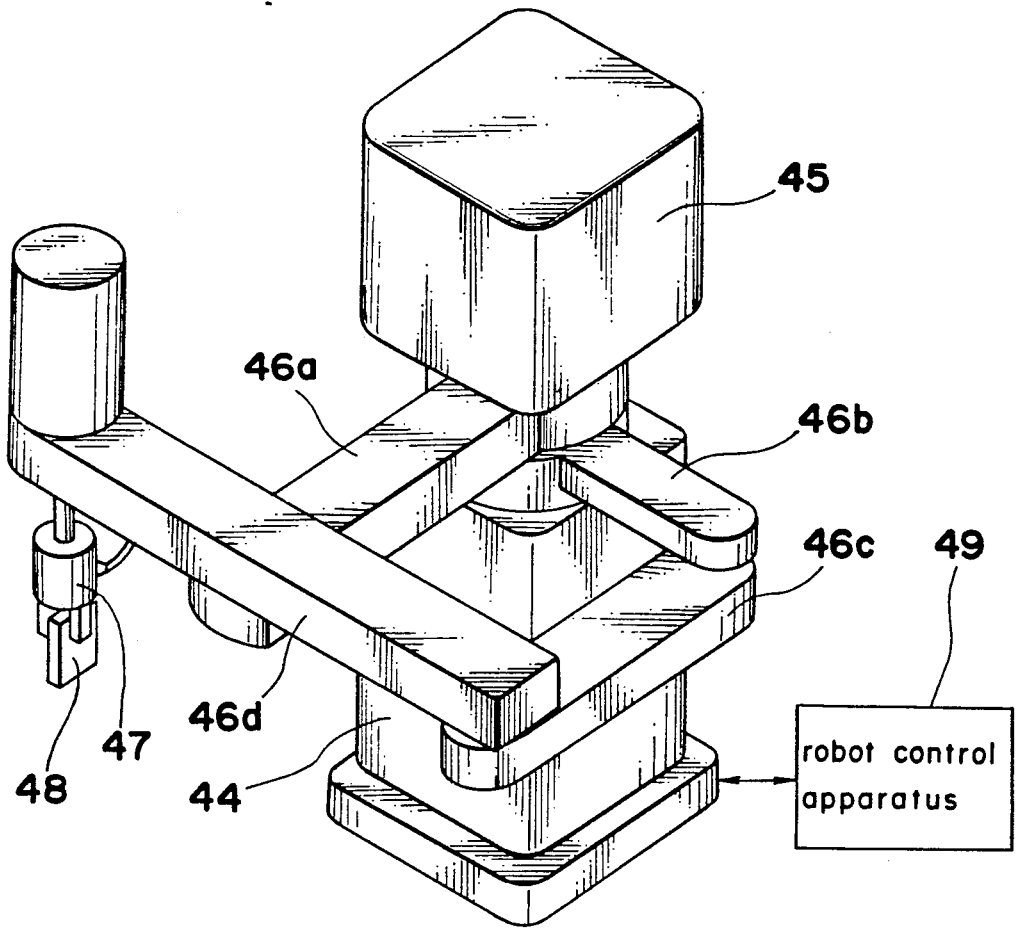
FIG. 8(a) is a combined perspective view and block diagram illustrating the construction of a second conventional robot and FIG. 8(b) is a diagram for showing the operation principle thereof.
Figure 8B:
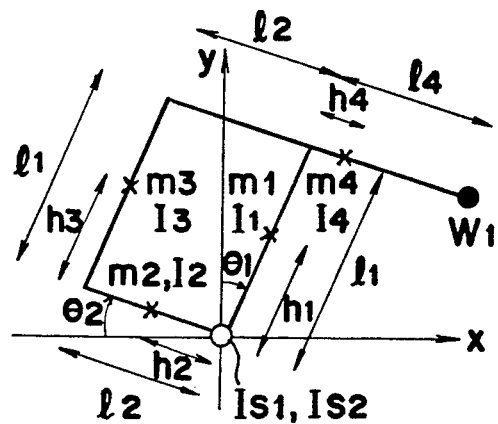

FIG. 5 shows the construction of a robot according to a third embodiment of the present invention. The robot in FIG. 5 includes a first prime mover 26, a second prime mover 27, first and second arms 28a and 28b, a load 29, a movement mechanism 30, an extension mechanism 31, and extension portion 32, a grasping mechanism 33, a force sensor 34, an object 35 to be grasped, a movement-extension control apparatus 36, and a robot control apparatus 37. One end of the first arm 28a is mounted on the driving shaft of the first prime mover 26. The second prime mover 27 is disposed on the other end of the first arm 28a, and the second arm 28b is mounted on the driving shaft of the second prime mover 27. The load 29 is movably amounted on the second arm 28b. The load 29 is connected to a movement portion of the movement mechanism 30 which can be an air cylinder as shown or a motor and ball screw or the like, so that the load 29 can be moved along the second arm 28b by the movement mechanism 30. One portion 32 of one end of the second arm 28b is separate from and adapted to move along the remainder of the second arm 28b as an extension portion by the extension mechanism 31 which can be an air cylinder as shown or a motor and ball screw or the like, disposed within the second arm 28b. The second arm 28b is extended and retracted so as to vary the position of the center of gravity of the second arm 28b. A grasping mechanism 33 is provided on the other end of the second arm 28b, and the object 35 is grasped by the grasping mechanism 33. The force sensor 34 is built into the grasping mechanism 33. The signal from the force sensor 34 is adapted to be inputted into the movement-extension control apparatus 36 so as to detect the mass of the grasped object 35 and to give proper operation instructions to the robot control apparatus 37. The robot control apparatus 37 receives the signal from the movement-extension control apparatus 36 to change the operation parameters of the center of gravity position of the arm in conformity with the present condition of the robot, and thereafter to control the operation of the first and second prime movers 26 and 27 and the grasping mechanism 33.

The operation of the robot constructed as described above is described below.

In the above described embodiment, in accordance with the operation data stored in advance within the memory (not shown) of the robot control apparatus 37, the operation instructions are given to the first and second prime movers 26 and 27 and the grasping mechanism 33 from the robot control apparatus 37 to move the arm 28 to effect the desired operations so as to effect the picking up and placing operation with respect to the object 35. At this time, the movement-extension control apparatus 36 normally watches the output signal from the force sensor 34. The moment, for example, the grasping mechanism 33 grasps the object 35, the movement-extension control apparatus 36 reads the amount of weight change and gives operation instructions to the movement mechanism 18 and the extension mechanism 31 in accordance with a predetermined simple calculation rule to be described later and to cause them to effect proper operation, so that the already described calculation results are transmitted to the robot control apparatus 37. The robot control apparatus 37 also effects the operation control for the arm 28 as described above, and also normally watches the input signal from the movement-extension control apparatus 36. Immediately after the input signal has been received, the predetermined parameters in the necessary operation torque production formula with respect to the first and second prime movers 26 and 27 to be described later are adjusted in accordance with the contents of the input signal so as to continue the operation control of the above described robot in accordance with the formula.

Figure 6:
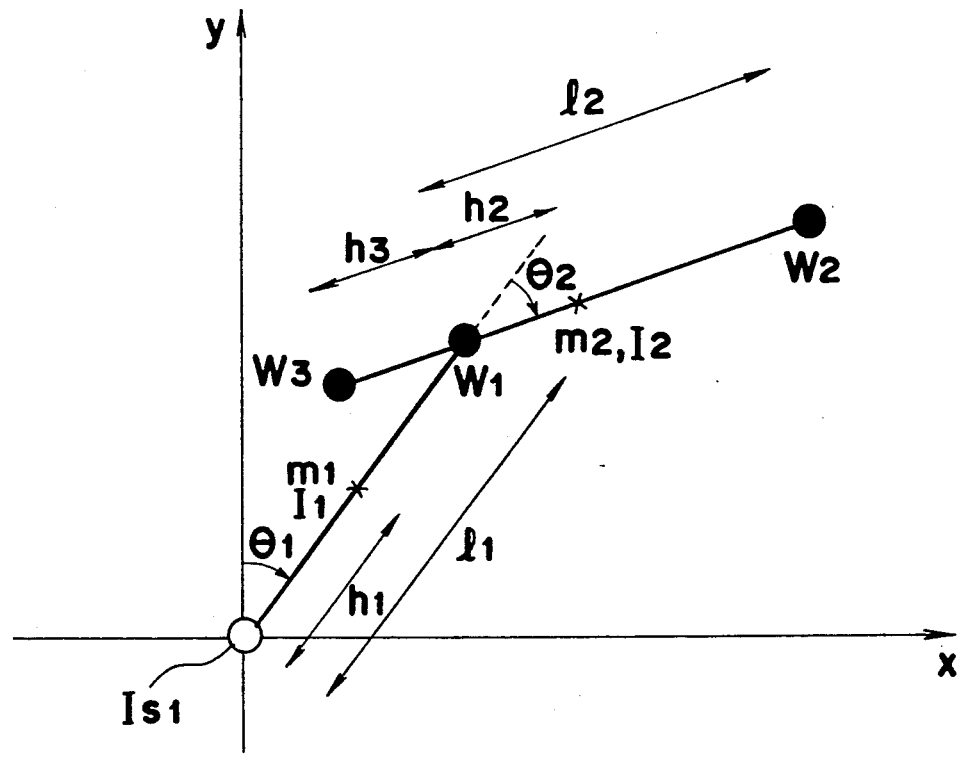
FIG. 6 is a diagram illustrating the operation principle of the robot shown in FIG. 5.

FIG. 6 shows the torques T1 and T2 caused in the first and second prime movers 26 and 27 when the above described picking up and placing operation is effected. In FIG. 6, the center of rotation of the first and second prime movers 26 and 27 conforms to the origin on the absolute coordinates axis (x-y), an angle to be formed with the first arm 28a and the y positive axis is $\Theta 1$, an angle to be formed by the first arm 28a and the second arm 28b is $\Theta 2$, the length of the first arm 28a, the mass, the inertial moment around the center of gravity, the force such as frictional force in the bearing portion are respectively l1, m1, I1, F1, the length of the second arm 28b, the mass, the inertial moment around the center of gravity, the force such as frictional force in the bearing portion are respectively l2, m2, I2, F2, the inertial moments of the first and second prime movers 26 and 27 are respectively Is2, Is2, the distance from the center of rotation of the first prime mover 26 to the center of gravity (shown by the X mark in the drawing) of the first arm 28a is h1, and the distance to the center of gravity (shown by an X in the drawing) of the second arm 28b from the tip end of the first arm 28a is h2, the mass of the second prime mover 27 which is located on the tip end of the first arm 28a is considered to be at a material point (shown by the • in the drawing) as w1, the mass of the grasping mechanism 33, the object 35 which is provided at the tip end of the second arm 28b is considered to be at the material point (shown by the mark in the drawing) as w2. The load 29 which is disposed on the second arm 28b, and is moved along the second arm 28b by the movement mechanism 30 is considered to be at the material point (shown by • mark in the drawing) as w3, the distance from the tip end of the first arm 28a to the material point position of the load 29 is h3. The torques T1 and T2 are given by the following dynamic equation of Lagrange.

$$\begin{pmatrix} T1 \\ T2 \end{pmatrix} = \begin{pmatrix} J11 & J12 \\ J21 & J22 \end{pmatrix} \begin{pmatrix} \ddot\theta 1 \\ \ddot\theta 2 \end{pmatrix} + \begin{pmatrix} E11 & E12 \\ E21 & E22 \end{pmatrix} \begin{pmatrix} \dot\theta 1^2 \\ \dot\theta 2^2 \end{pmatrix} + \begin{pmatrix} K1 \\ K2 \end{pmatrix} \dot\theta 1 \dot\theta 2 + \begin{pmatrix} F1 \\ F2 \end{pmatrix} \quad (7)$$

where $J11 = (m1h1^2 + m2l1^2 + m2h2^2 + w1l1^2 + w2l1^2 + w2l2^2 + w3l1^2 + w3h3^2 + I1 + I2 + Is1 + Is2) + 2(m2l1h2 + w2l1l2 - w3l1h3)\cos\theta 2$ $J12 = J21$
$= (w2h2^2 + w2l2^2 + w3h3^2 + I2 + Is2) + (m2l1h2 + w2l1l2 - w3l1h3)\cos\theta 2$ $J22 = m2h2^2 + w2l2^2 + w3h3^2 + I2 + Is2$ $E11 = E22 = 0$ $E12 = -E21$
$= -(m2l1h2 + w2l1l2 - w3l1h3)\sin\theta 2$ $K1 = -2(m2l1h2 + w2l1l2 - w3l1h3)\sin\theta 2$ $K2 = 0$ As $\Theta 2$ is included in respective formulas of J11, J12, J21, E12, K32, K1 in formula (7), the common coefficient of $\Theta 2$ become $$(m2l1h2 + w2l1l2 - w3l1h3) \quad (8),$$

the values of T1 and T2 change every moment during the operations of the first and second arms 28a and 28b if formula (8) is not "0", and dynamic interference components between the first and second prime movers change every moment because of the positive posture change in the second arm 28b with respect to the first arm 28a. In the case of the third robot, J12 and J21 which are the interference components of T1 and T2 cannot be offset completely as compared with those in the first and second robots. But as J12 and J21 become minimum values and E12, E21, K1 become "0" so at least formula (8) can be made "0", the interference components of T1 and T2 can be made minimum and simple. As a minus term is contained in formula (8), it can be made "0" by proper design of the arm. When the grasping mechanism 33 moves and places the object 35 which is comparatively large in mass, the value of w2 in formula (8) changes greatly between the case where the object 35 is grasped and the case where no object is grasped. If the design of the arm 28 is effected such that formula (8) will become "0" when no object is grasped, and formula (8) is adapted to have a value other than "0" when an object 35 is grasped, the components of dynamic interferences caused between the first and second prime movers 26 and 27 are increased and complicated. The movement-extension control apparatus 36 recognizes the variation in the amount w2 sensed by the force sensor 34 so as to cause the value w2l1l2 to be changed in formula (8) by the amount of variation. Thereafter, by the proper change of one or two values h3 changed by the operation of the movement mechanism 30 or h2, the amount of variation capable of offsetting the value of w1l1l2 is calculated, operation instructions are given to the movement mechanism 30 and extension mechanism 31 so as to cause them to effect the operations. At the same time, the changed values of h2, h3 are transmitted to the robot control apparatus 37. The robot control apparatus 37 changes h2, h3 from the parameter values of formula (7) stored in advance within the memory (not shown), so as to match the received values for continuing the operations of the first and second prime movers 26 and 27.

According to the robot of the third embodiment of the present invention, the movement mechanism 30 and the extension mechanism 31 are properly operated so that dynamic interference terms in the torque formula (7) for interference between the first and second prime movers 26 and 27 are made minimum and simple in response to the amount of variation at each of the weight changes of the object 35, so that dynamic interferences caused between the first and second prime movers 26 and 27 become minimum and the amount becomes easy to calculate with respect to the change in the operation track and the operation speed of the arm 28, thus achieving a comparatively stable robot operation.

Although only a driving mechanism in the form of an air cylinder as shown or a motor and ball screw has been described as the movement mechanism and the extension mechanism in the robot of the above described third embodiment, any other driving mechanism which can achieve the same results may, needless to say, be used.

Although the unimportant things especially among the material points which can exist in the arm are omitted as much as possible for the simple modeling of the robot in FIGS. 2, 4 and 6, the influences are not applied in theory if the contents in the torque formula of the T1 and T2 are different somewhat by the fixed material points not described hereinabove.

Also, the driving portions and the like which effect the vertical operations and the rotation portions which the above described grasping mechanism are conventional. Further, although an example where belting is used as the rotation transmission means to the second arm from the second prime mover is provided in the robot of the second embodiment, other transmission means such as gears and the like may be used.

As is clear from the foregoing description, according to the arrangement of the present invention, the load movement mechanism and the arm extension mechanism, which are provided on the robot arms can be operated in response to a changed condition between a case where a weight is picked up and placed and a case where no weight is grasped by the sensing of gravity force changes by a force sensor so that the mutual dynamic interferences of the respective driving portions of the robot are not caused or can be kept to a minimum, and may be made simple in shape by a comparatively simple control apparatus, with the effect that a superior robot which is capable of stable operations can be achieved.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as included therein.

What is claimed is:

1. An industrial robot, comprising:
   a first prime mover and a second prime mover each for producing horizontal rotational movement around coaxial shafts;
   a plurality of horizontal articulated type arms connected in a parallelogram link arrangement and having a firs arm having one end connected to said first prime mover for being driven in horizontal rotational movement around said one end, a second arm having one end connected to said second prime mover for being driven in horizontal rotational movement around said one end, a third arm coupled at one end to said second arm, and a fourth arm coupled at one end to said third arm and coupled to the other end of said first arm;
   a first load movably mounted on said third arm for reciprocal movement therealong, and a second load movably mounted on said fourth arm for reciprocal movement therealong;
   movement mechanisms on the respective third and fourth arms and connected to the respective first and second loads for moving the respective loads individually along said third and fourth arms;
   a grasping mechanism on said fourth arm for grasping an object and picking it up and moving it by the movement of said arms;
   a force sensor in said grasping mechanism for sensing the weight of an object picked up by said grasping mechanism;
   a control apparatus connected to said movement mechanisms and to which said force sensor is connected for controlling the movement of the respective loads in response to signals from said force sensor; and a further control apparatus connected to said prime movers and to said grasping mechanism for controlling the operations of said prime movers to drive said arms and the operation of said grasping mechanism to pick up and place an object, and to which said firstmentioned control apparatus is connected for supplying information relating to the movements of the respective loads for modifying a formula for the relative movement of the first and second prime movers so as to offset the dynamic interference components thereof in accordance with the movements of the loads in response to the change in weight of an object to be grasped.

2. An industrial robot, comprising:

a first prime mover and a second prime mover each for producing horizontal rotational movement around coaxial shafts;

a plurality of horizontal articulated type arms connected in a parallelogram link arrangement and having a first arm having one end connected to said first prime mover for being driven in horizontal rotational movement around said one end, a second arm having one end connected to said second prime mover for being driven in horizontal rotational movement around said one end, a third arm coupled at one end to said second arm, and a fourth arm coupled at one end to said third arm and coupled to the other end of said first arm;

a first extension portion movably mounted on said third arm for extension and retraction movement therealong, and a second extension portion movably mounted on said fourth arm for extension and retraction movement therealong; extension mechanisms on the respective third and fourth arms and connected to the respective first and second extension portions for moving the respective extension portions individually along said third and fourth arms, whereby said extension portions change the length of the respective arms;

a grasping mechanism on said fourth arm for grasping an object and picking it up and moving it by the movement of said arms;

a force sensor in said grasping mechanism for sensing the weight of an object picked up by said grasping mechanism;

a control apparatus connected to said extension mechanism and to which said force sensor is connected for controlling the movement of the respective extension portions in response to signals from said force sensor; and a further control apparatus connected to said prime movers and to said grasping mechanism for controlling the operations of said prime movers to drive said arms and the operation of said grasping mechanism to pick up and place an object, and to which said firstmentioned control apparatus is connected for supplying information relating to the movements of the respective extension portions for modifying the a formula for the relative movement of the first and second prime movers so as to offset the dynamic interference components thereof in accordance with the movements of the extension portions in response to the change in weight of an object to be grasped.

3. An industrial robot, comprising:

a first prime mover and a second prime mover each for producing horizontal rotational movement around coaxial shafts;

a plurality of horizontal articulated type arms connected in a parallelogram link arrangement and having a first arm having one end connected to said first prime mover for being driven in horizontal rotational movement around said one end, a second arm having one end connected to said second prime mover for being driven in horizontal rotational movement around said one end, a third arm coupled at one end to said second arm, and a fourth arm coupled at one end to said third arm and coupled to the other end of said first arm;

a first load movably mounted on said third arm for reciprocal movement therealong, and a second load movably mounted on said fourth arm for reciprocal movement therealong;

movement mechanisms on the respective third and fourth arms and connected to the respective first and second loads for moving the respective loads individually along said third and fourth arms;

a first extension portion movably mounted on said third arm for extension and retraction movement therealong, and a second extension portion movably mounted on said fourth arm for extension and retraction movement therealong;

extension mechanisms on the respective third and fourth arms and connected to the respective first and second extension portions for moving the respective extension portions individually along said third and fourth arms, whereby said extension portions change the length of the respective arms;

a grasping mechanism on said fourth arm for grasping an object and picking it up and moving it by the movement of said arms;

a force sensor in said grasping mechanism for sensing the weight of an object picked up by said grasping mechanism;

a control apparatus connected to said movement mechanisms and to which said force sensor is connected for controlling the movement of the respective loads and extension portions in response to signals from said force sensor; and a further control apparatus connected to said prime movers and to said grasping mechanism for controlling the operations of said prime movers to drive said arms and the operation of said grasping mechanism to pick up and place an object, and to which said firstmentioned control apparatus is connected for supplying information relating to the movements of the respective loads and extension portions for modifying a formula for the relative movement of the first and second prime movers so as to offset the dynamic interference components thereof in accordance with the movements of the loads and extension portions in response to the change in weight of an object to be grasped.

4. An industrial robot, comprising:

a first prime mover and a second prime mover each for producing horizontal rotational movement around coaxial shafts;

a plurality of horizontal articulated type arms and having a first arm having one end connected to said first prime mover for being driven in horizontal rotational movement around said one end, a second arm having one end pivotally mounted on another end of said first arm and belt means connecting said one end of said second arm to said second prime mover for driving said second arm in horizontal rotational movement around said one end;

a load movably mounted on said second arm for reciprocal movement therealong;

a movement mechanism on said second arm and connected to said load for moving the load along said second arm;

grasping mechanism on said second arm for grasping an object and picking it up and moving it by the movement of said arms;

a force sensor in said grasping mechanism for sensing the weight of an object picked up by said grasping mechanism;

a control apparatus connected to said movement mechanism and to which said force sensor is connected for controlling the movement of the load in response to signals from said force sensor; and a further control apparatus connected to said prime movers and to said grasping mechanism for controlling the operations of said prime movers to drive said arms and the operation of said grasping mechanism to pick up and place an object, and to which said firstmentioned control apparatus is connected for supplying information relating to the movements of the load for modifying a formula for the relative movement of the first and second prime movers so as to offset the dynamic interference components thereof in accordance with the movements of the load in response to the change in weight of an object to be grasped.

5. An industrial robot, comprising:

a first prime mover and a second prime mover each for producing horizontal rotational movement around coaxial shafts;

a plurality of horizontal articulated type arms and having a first arm having one end connected to said first prime mover for being driven in horizontal rotational movement around said one end, a second arm having one end pivotally mounted on another end of said first arm and belt means connecting said one end of said second arm to said second prime mover for driving said second arm in horizontal rotational movement around said one end;

an extension portion movably mounted on said second arm for reciprocal movement therealong;

an extension mechanism on said second arm and connected to said extension portion for moving the extension portion along said second arm, whereby said extension portion changes the length of said second arm;

a grasping mechanism on said second arm for grasping an object and picking it up and moving it by the movement of said arms;

a force sensor in said grasping mechanism for sensing the weight of an object picked up by said grasping mechanism;

a control apparatus connected to said movement mechanism and to which said force sensor is connected for controlling the movement of the extension portion in response to signals from said force sensor; and a further control apparatus connected to said prime movers and to said grasping mechanism for controlling the operations of said prime movers to drive said arms and the operation of said grasping mechanism to pick up and place an object, and to which said first mentioned control apparatus is connected for supplying information relating to the movements of the extension portion for modifying a formula for the relative movement of the first and second prime movers so as to offset the dynamic interference components thereof in accordance with the movements of the extension portion in response to the change in weight of an object to be grasped.

6. An industrial robot, comprising:

a first prime mover and a second prime mover each for producing horizontal rotational movement around coaxial shafts;

a plurality of horizontal articulated type arms and having a first arm having one end connected to said first prime mover for being driven in horizontal rotational movement around said one end, a second arm having one end pivotally mounted on another end of said first arm and belt means connecting said one end of said second arm to said second prime mover for driving said second arm in horizontal rotational movement around said one end;

a load movably mounted on said second arm for reciprocal movement therealong;

a movement mechanism on said second arm and connected to said load for moving the load along said second arm;

an extension portion movably mounted on said second arm for reciprocal movement therealong;

an extension mechanism on said second arm and connected to said extension portion for moving the extension portion along said second arm, whereby said extension portion changes the length of said second arm;

a grasping mechanism on said second arm for grasping an object and picking it up and moving it by the movement of said arm;

a force sensor in said grasping mechanism for sensing the weight of an object picked up by said grasping mechanism;

a control apparatus connected to said movement mechanism and to which said force sensor is connected for controlling the movement of the load and extension portion in response to signals form said force sensor; and a further control apparatus connected to said prime movers and to said grasping mechanism for controlling the operations of said prime movers to drive said arms and the operation of said grasping mechanism to pick up and place an object, and to which said firstmentioned control apparatus is connected for supplying information relating to the movements of the load and extension portion for modifying a formula for the relative movement of the first and second prime movers so as to offset the dynamic interference components thereof in accordance with the movements of the load and extension portion in response to the change in weight of an object to be grasped.

7. An industrial robot, comprising:

a first prime mover for producing horizontal rotational movement around a shaft;

a first horizontal articulated type arm having one end connected to said first prime mover for being driven in horizontal rotational movement around said one end;

a second prime mover for producing horizontal rotational movement around a shaft and mounted on another end of said first arm;

a second arm having one end mounted on said second prime mover for driving said second arm in horizontal rotational movement around said one end;

a load movably mounted on said second arm for reciprocal movement therealong;

a movement mechanism on said second arm and connected to said load for moving the load along said second arm;

a grasping mechanism on said second arm for grasping an object and picking it up and moving it by the movement of said arms;

a force sensor in said grasping mechanism for sensing the weight of an object picked up by said grasping mechanism;

a control apparatus connected to said movement mechanism and to which said force sensor is connected for controlling the movement of the load in response to signals from said force sensor; and a further control apparatus connected to said prime movers and to said grasping mechanism for controlling the operations of said prime movers to drive said arms and the operation of said grasping mechanism to pick up and place an object, and to which said firstmentioned control apparatus is connected for supplying information relating to the movements of the load for modifying a formula for the relative movement of the first and second prime movers so as to offset the dynamic interference components thereof in accordance with the movements of the load in response to the change in weight of an object to be grasped.

8. An industrial robot, comprising:

a first prime mover for producing horizontal rotational movement around a shaft;

a first horizontal articulated type arm having one end connected to said first prime mover for being driven in horizontal rotational movement around said one end;

a second prime mover for producing horizontal rotational movement around a shaft and mounted on another end of said first arm;

a second arm having one end mounted on said second prime mover for driving said second arm in horizontal rotational movement around said one end;

an extension portion movably mounted on said second arm for reciprocal movement therealong;

an extension mechanism on said second arm and connected to said extension portion for moving the extension portion along said second arm, whereby said extension portion changes the length of said second arm;

a grasping mechanism on said second arm for grasping an object and picking it up and moving it by the movement of said arms;

a force sensor in said grasping mechanism for sensing the weight of an object picked up by said grasping mechanism;

a control apparatus connected to said movement mechanism and to which said force sensor is connected for controlling the movement of the extension portion in response to signals form said force sensor; and a further control apparatus connected to said prime movers and to said grasping mechanism for controlling the operations of said prime movers to drive said arms and the operation of said grasping mechanism to pick up and place an object, and to which said firstmentioned control apparatus is connected for supplying information relating to the movements of the extension portion for modifying a formula for the relative movement of the first and second prime movers so as to offset the dynamic interference components thereof in accordance with the movements of the extension portion in response to the change in weight of an object to be grasped.

9. An industrial robot, comprising:

a first prime mover for producing horizontal rotational movement around a shaft;

a first horizontal articulated type arm having one end connected to said first prime mover for being driven in horizontal rotational movement around said one end;

a second prime mover for producing horizontal rotational movement around a shaft and mounted on another end of said first arm;

a second arm having one end mounted on said second prime mover for driving said second arm in horizontal rotational movement around said one end;

a load movably mounted on said second arm for reciprocal movement therealong;

a movement mechanism on said second arm and connected to said load for moving the load along said second arm;

an extension portion movably mounted on said second arm for reciprocal movement therealong;

an extension mechanism on said second arm and connected to said extension portion for moving the extension portion along said second arm, whereby said extension portion changes the length of said second arm;

a grasping mechanism on said second arm for grasping an object and picking it up and moving it by the movement of said arms;

a force sensor in said grasping mechanism for sensing the weight of an object picked up by said grasping mechanism;

a control apparatus connected to said movement mechanism and to which said force sensor is connected for controlling the movement of the load and extension portion in response to signals from said force sensor; and a further control apparatus connected to said prime movers and to said grasping mechanism for controlling the operations of said prime movers to drive said arms and the operation of said grasping mechanism to pick up and place an object, and to which said firstmentioned control apparatus is connected for supplying information relating to the movements of the load and the extension portion for modifying a formula for the relative movement of the first and second prime movers to as to offset the dynamic interference components thereof in accordance with the movements of the load and extension portion in response to the change in weight of an object to be grasped.

* * * * *